United States Patent [19]
Hansen

[11] 3,938,036
[45] Feb. 10, 1976

[54] METHOD OF ASCERTAINING AND CORRECTING WORKPIECE TURNING

[75] Inventor: Erik Hansen, Otterup, Denmark

[73] Assignee: A/S Haustrups Fabriker, Odense, Denmark

[22] Filed: May 5, 1972

[21] Appl. No.: 250,618

Related U.S. Application Data

[63] Continuation of Ser. No. 51,909, July 2, 1970, abandoned.

[52] U.S. Cl. .............................................. 324/34 R
[51] Int. Cl.² ......................................... G01R 33/00
[58] Field of Search ............................ 324/34 R, 41

[56] References Cited
UNITED STATES PATENTS 2,989,735   6/1961   Gumpertz ......................... 324/41 X
3,557,335   1/1971   Sablotny .......................... 324/34 R

FOREIGN PATENTS OR APPLICATIONS 575,219   5/1959   Canada

Primary Examiner—Robert J. Corcoran
Attorney, Agent, or Firm—Diller, Brown, Ramik & Wight

[57] ABSTRACT

This disclosure relates to a magnetic system for controlling the rotational orientation of workpieces during the moving thereof from one work station to another. A magnetic sensing line is applied to the workpiece immediately adjacent the first work station and thereafter it is sensed adjacent the second work station where a workpiece found to be improperly oriented is either ejected or rotated.

6 Claims, 8 Drawing Figures

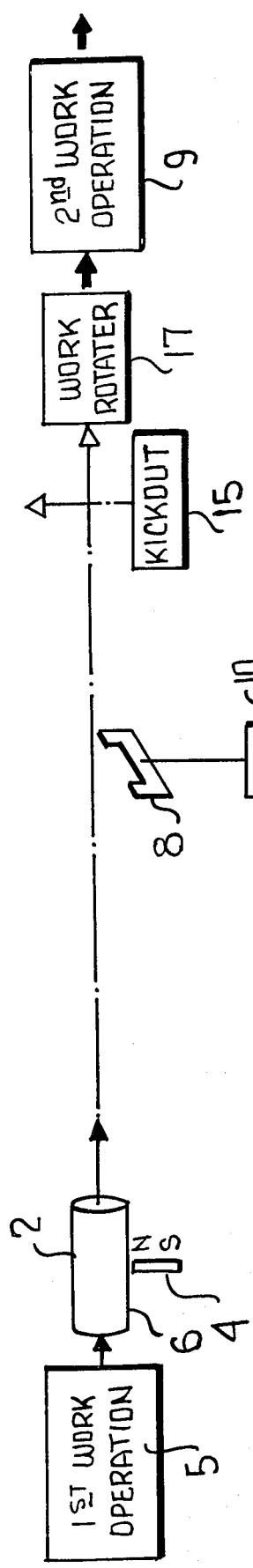
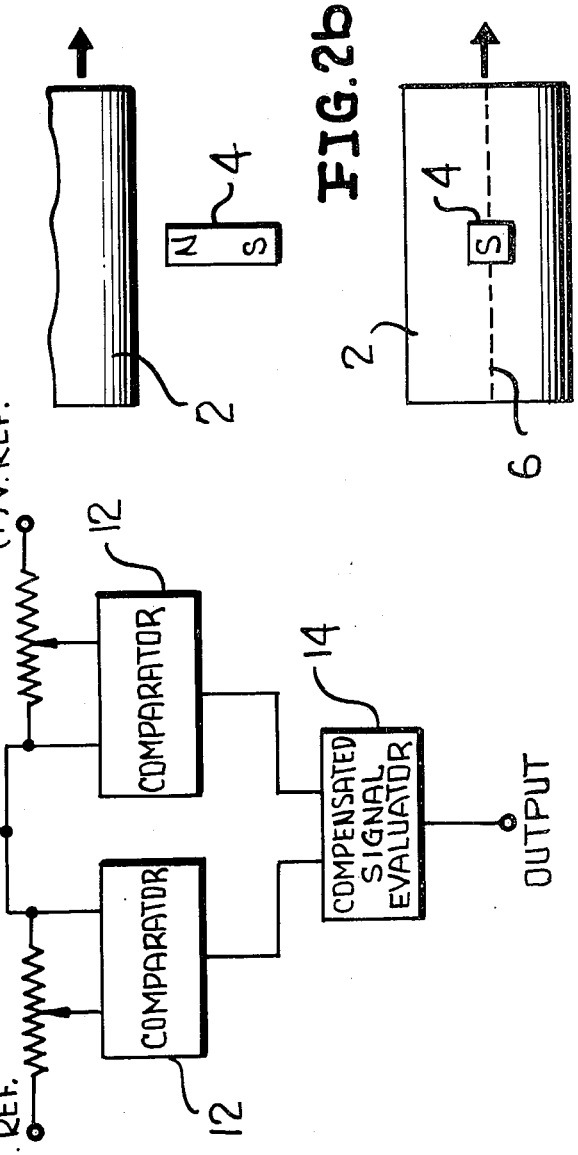
FIG. 1
FIG. 2a
FIG. 2b
INVENTOR
ERIK HANSEN

INVENTOR
ERIK HANSEN

METHOD OF ASCERTAINING AND CORRECTING WORKPIECE TURNING

This is a continuation of application Ser. No. 51,909, filed July 2, 1970, and now abandoned.

The invention concerns a method for ascertaining whether a ferromagnetic workpiece that is being conveyed from a first to one or more subsequent work operations has changed position in the later operations from the position assumed in the first operation.

For example, in the manufacturing of flanged soldered cans, when the first operation is a flanging and a subsequent one is soldering of the side seam, attempts have previously been made to secure the can so that after flanging it is conveyed for soldering without changing its angular position. If the can nevertheless turns between flanging and soldering, the soldering will take place outside the seam whereby the can becomes leaky, which condition will not be detected until the can subsequently is filled. As this can create considerable inconvenience, it would be desirable if improperly soldered cans could be rejected immediately, which means that cans that have turned between flanging and soldering have to be rejected.

The purpose of the invention is to indicate a method by which workpieces that have turned after the first operation can be detected and possibly rejected or made the subject of a corrective movement.

The method of the invention is characterized in that in connection with the first operation there is laid in a magnetic track on the workpiece with a certain placement in relation to the site on the workpiece where the operation is performed, which track in combination with the subsequent operation or operations is detected by magnetism detecting means that have the same placement in relation to the desired placement of the first work site on the can during the subsequent operation or operations.

The magnetizing means that are used to lay in the magnetic track can be either permanent magnets or electromagnets, and can be shaped like rod magnets or horseshoe magnets or can have any other suitable configuration. The field strength along the cross section of the track varies in different ways depending on which type of magnet has been used, so that the signal transmitted by the magnetism detecting means can be used to measure the magnitude of the deviation from the desired position.

This can be important when a certain greater or lesser angular turn can be permitted, since the detecting means in connection with a logic circuit can determine whether a turning beyond the permissible has taken place, and likewise the magnitude of a possibly necessary correction can be calculated.

According to the invention the signal transmitted by the magnetization detecting means can be utilized for taking the workpiece out of the operating process, whereby workpieces that have turned beyond the permissible for example can be rejected.

According to the invention a correction can possibly be made in the position of workpieces that have turned away from the desired position, in that the signal transmitted by the magnetization detecting means is utilized for correction of the position of the workpiece, if this deviates from the desired position.

The invention is explained in the following with reference to the drawing, in which:

FIG. 1 is a schematic view with parts in perspective showing the method of the invention.

FIGS. 2A and 2B are schematic elevation and plan views respectively showing how the track is laid in by means of a rod magnet.

Figure 3A:
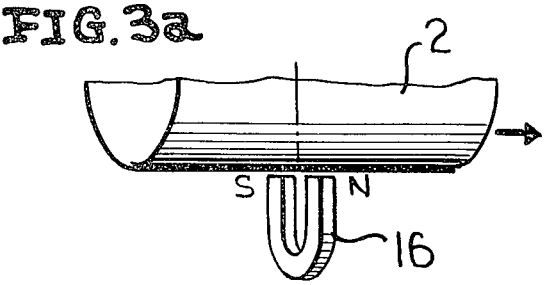
FIGS. 3A and 3B are schematic elevation and plan views respectively showing how the track is laid in by means of a horseshoe magnet.

In FIG. 1 a ferromagnetic workpiece 2 passes a rod magnet 4 that is disposed in suitable manner in relation to a first operation 5. Hereby a magnetic track is laid into the workpiece, which track is shown by way of a dotted line 6. A detecting element 8 is placed at the desired site of the track 6 in a subsequent or second work operation 9, which element can be a conventional Hall generator provided with a suitable magnetic circuit or other form of magnetic field strength indicator whose output signal is conveyed through an amplifier 10 and a comparison circuit 12, by means of which the said output signal can be compared with a predetermined value, to a compensated signal evaluator 14, which in its simplest form may be a logic circuit, in which the received signal is evaluated in accordance with previously determined standards, which evaluation results in a suitable signal such as a rejection, approval or correction signal in the output thereof, all according to the construction and purpose of this circuit.

The compensated signal evaluator 14 may emit a signal which will serve to actuate a kickout 15 when it has been determined that the track 6 has rotated beyond a predetermined degree. In this arrangement, the comparative circuit 12 may be set to emit a signal in accordance with the selected range of misalignment, and the compensated signal evaluator 14 may be in the form of a simple logic circuit such as an "and" circuit.

Figure 3B:
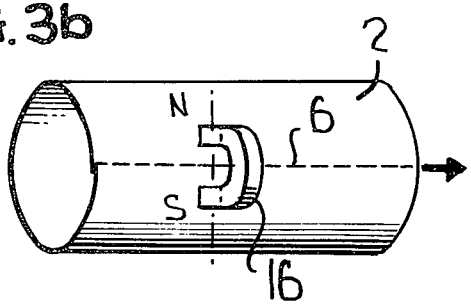
Figure 4A:
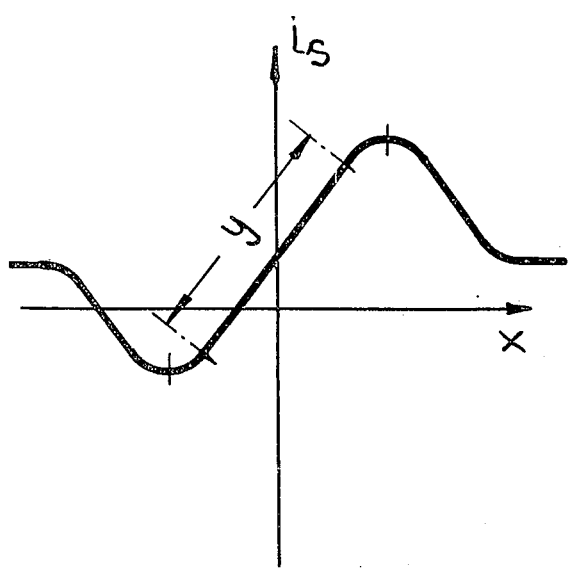
FIGS. 4A and 4B are diagrams of the output current of the detecting means as a function of the distance from the center of the track shown for a track laid in with a rod magnet and with a horseshoe magnet, respectively.
Figure 4B:
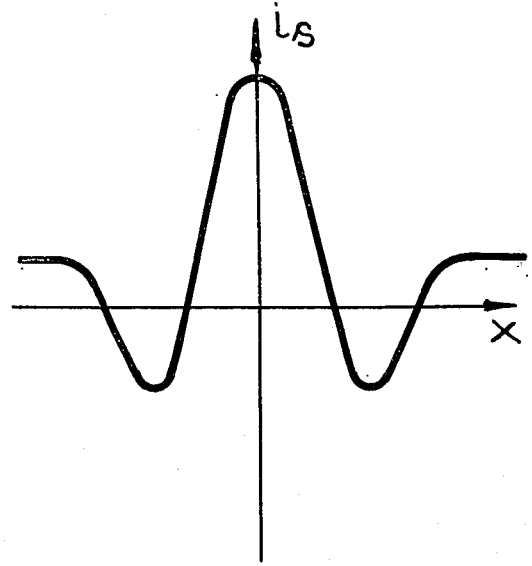

If desired, there may be incorporated in the mechanism for moving the work 2 from the first work operation 5 to the second work operation 9 a suitable work rotator 17. The work rotator 17 could be constructed to rotate a workpiece 2 a predetermined angular amount in a selected one of clockwise and counterclockwise directions. If a work rotator is utilized, the compensated signal evaluator would have to be more than a simple logic circuit, but could be in the form of any conventional signal evaluator which would receive the compensated signals from the comparative circuit and would emit a signal to actuate the kickout 15 if the misalignment of the track 6 is too great, or a suitable signal to actuate the work rotator in the proper direction to re-orient the workpiece 2. As indicated above, a typical use of the invention is where the workpiece 2 is a can body having a side seam which is formed in the first work operation and wherein the side seam is to be soldered in the second work operation. A typical example of permissive misalignment would be 5° in either direction. When the compensated signal evaluator is a simple logic circuit, it would merely function to transmit a signal to the kickout 15 to kick out a workpiece 2 having excessive misalignment. On the other hand, when the compensated signal evaluator 14 is of a more complex nature and will react to degrees of signals, it may be utilized to actuate both the kickout 15 and the work rotator 17. A typical example of such usage with respect to a can body seam would be that it would be set to actuate the kickout 15 when the misalignment exceeds 15° in either direction. When the misalignment is 5° or less in either direction, no signal would be transmitted to either the kickout or the work rotator. On the other hand, when the misalignment is between 5° and 15° in either direction, the signal transmitted from the signal evaluator 14 would actuate the work rotator to rotate the workpiece 2 in the proper direction. This would always assure that the misalignment of the workpiece 2 not kicked out by the kickout 15 would be within 5° of the desired position. A more specific description of the function of the detector follows:

FIGS. 2A and 2B show the placement of the track 6 on the workpiece 2 during magnetization with the rod magnet 4 while FIGS. 3A and 3B show the placement of the track with a horseshoe magnet 18. FIGS. 4A and 4B show the field strength variation in the transverse direction $x$ of the track expressed by the output current $i_s$ from the detector, as $i = k \cdot B$, where $k$ is a constant and $B$ is the magnetic induction in the detector circuit.

As seen in FIG. 4A, the output signal from the detector is specific in a wide area $y$ on both sides of the center of the track for the distance from the latter and indicates in case of magnetization with rod magnet also the distance from the center of the track calculated with signs. The last mentioned form of magnetization thus opens the way for a proportional regulation that is well suited for correction purposes, while both forms of magnetization are well suited for on-off regulation, as the levels at which such a regulation is to take effect can be adjusted by comparison circuit 12 and the arrangement of the compensated signal evaluator circuit 14. In the laboratory, regulating accuracies of less than ±0.05 have been obtained.

Figure 5:
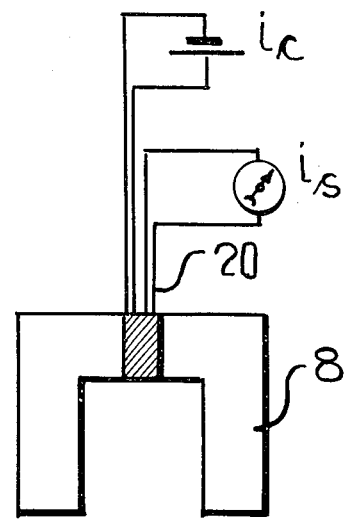
FIG. 5 is a schematic showing of a detector with Hall generator.

FIG. 5 shows schematically a detecting device consisting of a magnetic circuit 20 with a conventional Hall generator built in. The Hall generator is loaded in known manner with a constant current and gives an output current that is proportional to the magnetic field strength between the poles shoes, as $i_s = k \cdot B$ when $k$ is a constant that depends on the data of the Hall generator, the magnitude of the load current and the magnetic circuit formed by the generator and the pole shoes, and $B$ is the magnetic induction through the generator produced by the magnetic field strength between the pole shoes.

In the example described it is assumed that the workpiece moves past the magnet 4 or 16 and the detecting means 8, but the track 6 can of course be laid in by any relative motion between the workpiece and these means and likewise a plurality of tracks can be laid in or there can be a plurality of detectors distributed along the surface of the workpiece, so that besides a possible turning of the workpiece also other changes in the position of the workpiece can be ascertained.

The embodiments of the invention in which an exclusive property or privilege is claimed are defined as follows:

1. Method for ascertaining whether a ferromagnetic cylindrical workpiece having an axis and being conveyed generally axially along a path of travel from a first work operation to a subsequent work operation has rotated about its axis away from the position assumed in the first work operation comprising the steps of in connection with the first work operation applying an axial magnetic track on the workpiece with a certain rotational placement about the workpiece axis in relation to a selected site where the first work operation is performed on the workpiece, and in combination with the subsequent work operation detecting the magnetic track on the workpiece by magnetism detecting means that have the same rotational placement with respect to the workpiece axis relative to the selected site of the first work site.

2. Method as in claim 1, characterized in that the axial magnetic track is such that the signals transmitted by the magnetism detecting means can be utilized for measurement of the magnitude of a limited rotational deviation from the desired position.

3. Method as in claim 2, characterized in that a signal transmitted by the magnetization detecting means is utilized for taking the workpiece out of the subsequent work operation process when the limited rotational displacement is excessive.

4. Method as in claim 2, characterized in that the signal transmitted by the magnetization detecting means is utilized for correction of the limited rotational position of the workpiece when the position thereof deviates from the desired position.

5. Method as in claim 1, characterized in that a signal transmitted by the magnetization detecting means is utilized for taking the workpiece out of the subsequent work operation process when the rotational displacement is excessive above a predetermined limit.

6. Method as in claim 1, characterized in that the signal transmitted by the magnetization detecting means is utilized for correction of the rotational position of the workpiece when the position thereof deviates from the desired position a limited amount.

* * * * *

UNITED STATES PATENT AND TRADEMARK OFFICE
CERTIFICATE OF CORRECTION

PATENT NO. : 3,938,036
DATED : February 10, 1976
INVENTOR(S) : ERIK HANSEN

It is certified that error appears in the above-identified patent and that said Letters Patent are hereby corrected as shown below:

Under the heading "Foreign Application Priority Data: please insert:

August 21, 1969   Danish Application   4,494/69

Signed and Sealed this first Day of June 1976

[SEAL]

Attest:

RUTH C. MASON
Attesting Officer

C. MARSHALL DANN
Commissioner of Patents and Trademarks